United States Patent [19]

Dunbar

[11] 4,297,071
[45] Oct. 27, 1981

[54] WEIGHT TRANSFER APPARATUS

[76] Inventor: Glenn G. Dunbar, 2608 Overbrook Dr., Toledo, Ohio 43614

[21] Appl. No.: 81,026

[22] Filed: Oct. 1, 1979

[51] Int. Cl.³ .............................................. B60P 1/00
[52] U.S. Cl. ...................................... 414/542; 212/74
[58] Field of Search ............... 414/542, 540, 541, 544; 212/74, 39 R, 39 B; 104/246, 245, 95

[56] References Cited

U.S. PATENT DOCUMENTS

| | | | |
|---|---|---|---|
| 1,124,217 | 1/1945 | Emery | 212/74 X |
| 2,730,249 | 1/1956 | Edwards | 414/542 |
| 2,778,512 | 1/1957 | Strona | 212/74 X |
| 3,006,485 | 10/1961 | Martin | 212/74 X |
| 3,540,380 | 11/1970 | Tumpak et al. | 104/246 |

OTHER PUBLICATIONS

Cargomaster, Wayne Engineering Corp., Form 12-7-1-10.

Primary Examiner—Robert B. Reeves
Assistant Examiner—Gene A. Church
Attorney, Agent, or Firm—Emch, Schaffer, Schaub & Todd

[57] ABSTRACT

A weight handling vehicle having a rear cargo compartment with a bed and side walls. A frame adjacent the sidewalls supports a carriage that moves horizontally along the top of the frame and telescopes out the rearward end of the vehicle. A trolley, supporting a hoist for lifting the weight units, moves on the carriage and, when used in tandem with the telescoping carriage, transfers weight units from within the rear cargo compartment to a point exterior of and spaced apart from the rearward end of the cargo compartment.

18 Claims, 15 Drawing Figures

WEIGHT TRANSFER APPARATUS

BACKGROUND OF THE INVENTION

This invention is directed toward a weight transfer apparatus for providing a means of loading and unloading test weights from a standard truck onto a scale testing vehicle or the ground. Specifically the weight transfer apparatus will telescope from the rearward end of the truck when operating and retract inside the truck when not in operation.

Other cargo transfer mechanisms for trucks which are known to the inventor consist of two types. One device is a swing styled crane mounted on a post located in the center of the truck bed. This crane is commonly used with trucks that carry loads of brick and other construction materials. One disadvantage of this device is the center post which eliminates space for storage and obstructs the flow of materials on the truck bed. A second disadvantage relates to the necessary lack of sidewalls in the cargo compartment to allow the crane to swing around the perimeter of the truck bed. Other models of the swing crane version have the center post located at the front or the rear of the cargo bed, however, the abovementioned disadvantages remain.

The other cargo transfer device of which the inventor has knowledge relates to a hoist which rides upon rails fixed to the sidewalls of the rear cargo compartment. A pair of extension swing booms are pivotally fixed to the rearward end of the rear cargo compartment in such a manner that they can be swung to extend the rail lengths to the exterior of the truck. The extended rail lengths then allow the hoist to move to the exterior of the rearward portion of the rear cargo compartment. A major disadvantage with this device relates to the swing booms and their fixation to the rear of the truck. The swing booms, when not in operation, must be folded across the rear of the truck or, if the rear of the cargo compartment has doors, must be folded to a position within the cargo compartment. This eliminates potential cargo space.

The present invention eliminates the disadvantages mentioned above. The supporting frame fits adjacent the sidewalls of the rear cargo compartment. All moving parts of the invention are adjacent the ceiling of the rear cargo compartment, thereby providing access to the entire bed and storage area within the cargo compartment. The telescoping carriage mechanism is an integral partner with the hoist.

SUMMARY OF THE INVENTION

The weight transfer device of the present invention comprehends a horizontal telescoping carriage which moves on tracks connected to the top of a support frame which is located adjacent the sidewalls of a truck. The telescoping carriage has a trolley that moves along the rails of the carriage, which parallel the tracks of the frame. A hoist, having a drive motor and a brake, is located on the trolley. The hoist provides the vertical force for lifting the weight units.

The telescoping carriage is moved relative to the frame by a worm screw rotatably fixed in the top of the frame. The worm screw is driven by a reversible hydraulic motor. Connecting the worm screw to the carriage is a standard rolled thread ball bearing screw assembly. The worm screw is threaded through the ball bearing screw assembly so that the carriage telescopes from the rearward end of the cargo compartment as the worm screw is rotated.

A second worm screw for driving the trolley runs the length of the carriage parallel to the first worm screw. The second worm screw is rotatably fixed between the two opposing ends of the carriage and is driven by a second reversible hydraulic motor. Connecting the worm screw to the trolley is a second standard rolled thread ball bearing screw assembly. The second worm screw is threaded through the second ball bearing screw assembly so that the trolley moves along the carriage as the second worm screw is rotated.

The hoist is mounted on the trolley and has a motor and a brake interconnected by means of a shaft. The lift bar is connected to the shaft by sprockets located on the shaft and lift bar which are used to drive a chain. The lift bar is designed so that its hooks slip into pre-designated slots found in the weight units.

When the weight transfer device is in operation, it provides the means for moving heavy quantities of weight (i.e. 1000 lbs/hook) in an unbroken continual motion. There are no obstructions within the cargo compartment as found in other devices, nor is there the need to use swing-type extension booms. The entire unit is entirely self-contained within the confines of the top of the rear cargo compartment, thus eliminating the need to provide clearance for extension swing boom. The structure of the device also allows for optional sidewalls roof or door on the rear cargo compartment.

It is a primary object of this invention to provide an efficient method of moving large quantities of weights from their storage in in the cargo compartment of a weight truck.

Another objective is to provide a weight transfer device for lifting large quantities of weights which is space efficient and allows optimum use of the cargo compartment.

Other objects and advantages of the invention will become apparent in the following detailed description of the preferred form thereof, reference being had to accompany the drawings.

DESCRIPTION OF THE PREFERRED EMBODIMENT

The weight transfer device (10) illustrated in the drawings is a horizontal telescoping mechanism combined with a vertical lifting mechanism. A frame (11) supports the telescoping carriage (12) which in turn supports the trolley (13). Mounted on the trolley (13) is the hoist (14) which includes a motor (15), brake (16), lift bar (17), drive shaft (18), chains (19) and sprockets (20). Of course, other types of driving means such as cables can be used rather than chains (19) and sprockets (20).

The frame (11) includes three ribs (21, 22, 23) adjacent the sidewalls (24) and, in the preferred embodiment, the roof (25) of the rear cargo compartment (26). The first rib (21) is located at the front end of the rear cargo compartment (26); the second rib (22) is located at the rearward end of the rear cargo compartment (26); and the third rib (23) is located between the first rib (21) and second rib (22).

Two horizontal and opposed parallel tracks (27) are fixed to the ribs (21, 22, 23). These tracks (27) are located adjacent the junctures of the roof (25) and sidewalls (24) of the rear cargo compartment (26). Each opposed track (27) includes a supporting roller guide (28) located adjacent the second rib (22) and fixed so that the telescoping carriage (12) rests upon the support roller (29) of the supporting roller guide (28). The supporting roller guide (28) includes a vertical support plate (30) which is fixed to the track (27) so that it extends below the bottom surface of the track (27). The support roller (29) is mounted on the vertical support plate (30) and extends into the rear cargo compartment (26) opposite the track (27). A carriage wear plate (31) is fixed to the vertical support plate (30) above the support roller (29).

The preferred embodiment of the frame (11) also includes a first worm screw (32) rotatably connected between the first rib (21) and third rib (23) at the top centerline of the rear cargo compartment (26). A first hydraulic motor (33) fixed to the first worm screw (32) at the third rib (23) provides the power for rotating the first worm screw (32).

Equally spaced on opposite sides from the first worm screw (32) and connected between the first rib (21) and third rib (23) parallel the first worm screw (32) are two carriage aligning guide members (34). The parallel carriage aligning guide members (34) pass through the telescoping carriage (12) and serve to keep the telescoping carriage (12) in line and on track as it operates under the heavy stresses and forces occasioned by ligting weight units.

The telescoping carriage (12) includes two opposed and horizontal rails (35) located adjacent and parallel the tracks (27) of the frame (11). Fixed between the ends of the rails (35) are two carriage cross-braces (36). Each rail (35) is positioned so that it rides upon the supporting roller (29) of the supporting roller guide (28) which is fixed to each track (27). At the end of the telescoping carriage (12) located nearest the front of the rear cargo compartment (26) are telescoping roller guides (37). One telescoping roller guide (37) is fixed to each rail (35) and includes a second vertical support plate (38) fixed to the rail (35) so that the second vertical support plate (38) extends above the top surface and below the bottom surface of the rail (35). Two carriage rollers (39) are mounted on the second vertical support plate (38) so that the carriage rollers (39) interact with the top surface and bottom surface of the track (27). When in operation the telescoping carriage (12) rests on the support rollers (29) which are fixed to the tracks (27) and slides through the action of the carriage rollers (39) surrounding each track (27). A second wear plate (40) is fixed to the second vertical support plate (38) between the two carriage rollers (39).

The preferred embodiment of the telescoping carriage (12) also includes a first standard rolled thread ball bearing screw assembly (41) through which the first worm screw (32) is threaded so that the telescoping carriage (12) moves on the first worm screw (32) as it is rotated. The first standard rolled thread ball bearing screw assembly (41) is fixed to the carriage cross-brace (36) located nearest the front of the rear cargo compartment (26) and contains an elongated oval passageway (42). The elongated oval passageway (42) produces a floating thread affect which adapts to any eratic movement by the first worm screw (32).

A second worm screw (43) is rotatably connected between the carriage cross braces (36) along the centerline of the telescoping carriage (12). A second hydraulic motor (44) fixed to the second worm screw (43) provides the power for rotating the second worm screw (43). The second worm screw (43) drives the trolley (13) which rides on the telescoping carriage (12).

Equally spaced on opposite sides from the second worm screw (43) and connected between the carriage cross-braces (36) parallel the second worm screw (43) are two trolley aligning guide members (45). The parallel trolley aligning guide members (45) pass through the trolley (13) and serve to keep the trolley (13) on track as it operates under the heavy stresses and forces occasioned by lifting weight units.

The trolley (13) includes two opposed trolley rolling units (46) fitted to ride the inside edges of the two opposed rails (35). Fixed between the trolley rolling units (46) are two opposed trolley cross-braces (47). Each trolley rolling unit (46) includes a trolley support bar (48) which is located adjacent and parallel to the inside edge of each rail (35) of the telescoping carriage (12). The trolley support bar (48) has two trolley support rollers (49) mounted so that the trolley support rollers (49) move on the rail (35) and support the trolley (13) as the trolley (13) operates.

Two trolley alignment rollers (50) are mounted on each trolley support bar (48), the rolling surface of the trolley alignment rollers (50) being perpendicular to the rolling surface of the trolley support rollers (49). The trolley alignment rollers (50) move on the vertical surface of each rail (35) and function to keep the trolley (13) squared within the telescoping carriage (12). In the preferred embodiment of this invention, the trolley alignment roller (50) are adjustable.

The trolley (13), as used in this invention, includes a second standard rolled thread ball bearing screw assembly (51) through which the second worm screw (43) is threaded so that the telescoping carriage (12) moves on the second worm screw (43) as it is rotated.

The hoist (14) for lifting the weight units is supported by the trolley cross-braces (47). A hydraulic motor (15) and a hydraulic brake (16) are connected to opposing ends of a shaft which is located between the two trolley cross-braces (47). The hydraulic brake (16) and the hydraulic motor (15) are interconnected to provide automatic braking forces whenever the motor (15) is not operating. [This feature of the invention is not claimed as it is my understanding that the means of the interconnection of a drive motor and a brake is common to the art.]

Fixed to the shaft are two shaft sprockets (20) for driving the chain (19) that connects the lift bar (17) with the motor (15), brake (16) and shaft (18) assembly. The shaft (18) with the two shaft sprockets (20) are enclosed in a sheath (52). Of course, other embodiments of this invention may utilize a different connecting means such as heavy cable.

The lift bar (17) includes three equally spaced hooks (53) joined together by a traversing member (54). The hooks (53) are spaced to accommodate a separate weight unit on each hook (53). Each weight unit is fitted to receive a hook (53) and the weight units are spaced apart in the rear cargo compartment (26) so as to receive the hooks (53) as the lift bar (17) is lowered to engage the hooks (53) with the weight units. Two lift bar sprockets (55) are fixed within the traversing member (54) and are aligned with the shaft sprockets (20) to receive the chain (19) from the shaft sprockets (20).

Figure 1:
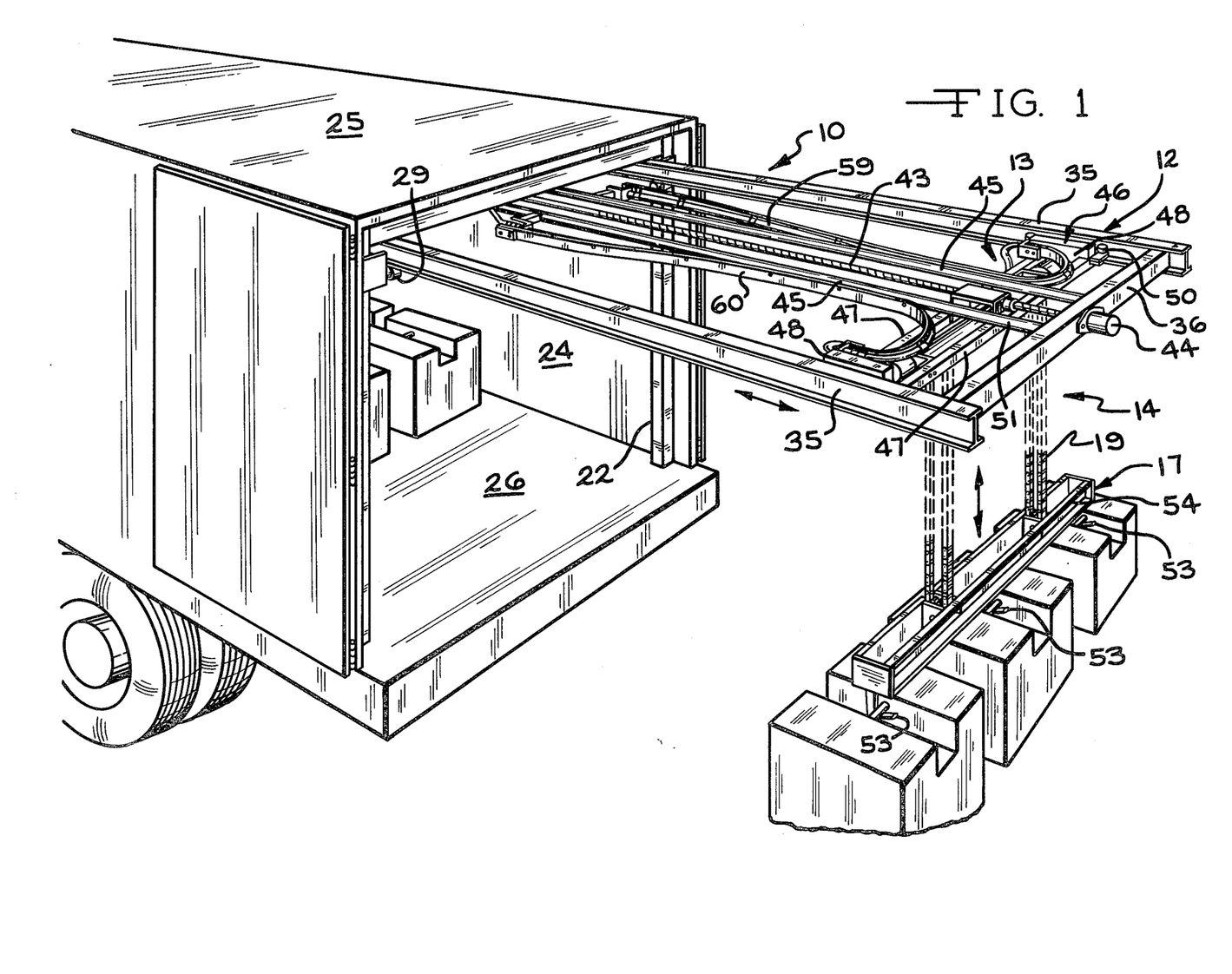
FIG. 1 is a perspective view of a weight handling vehicle having a rear cargo compartment and telescoping carriage, trolley and hoist assemblies constructed in accordance with the present invention.
Figure 2:
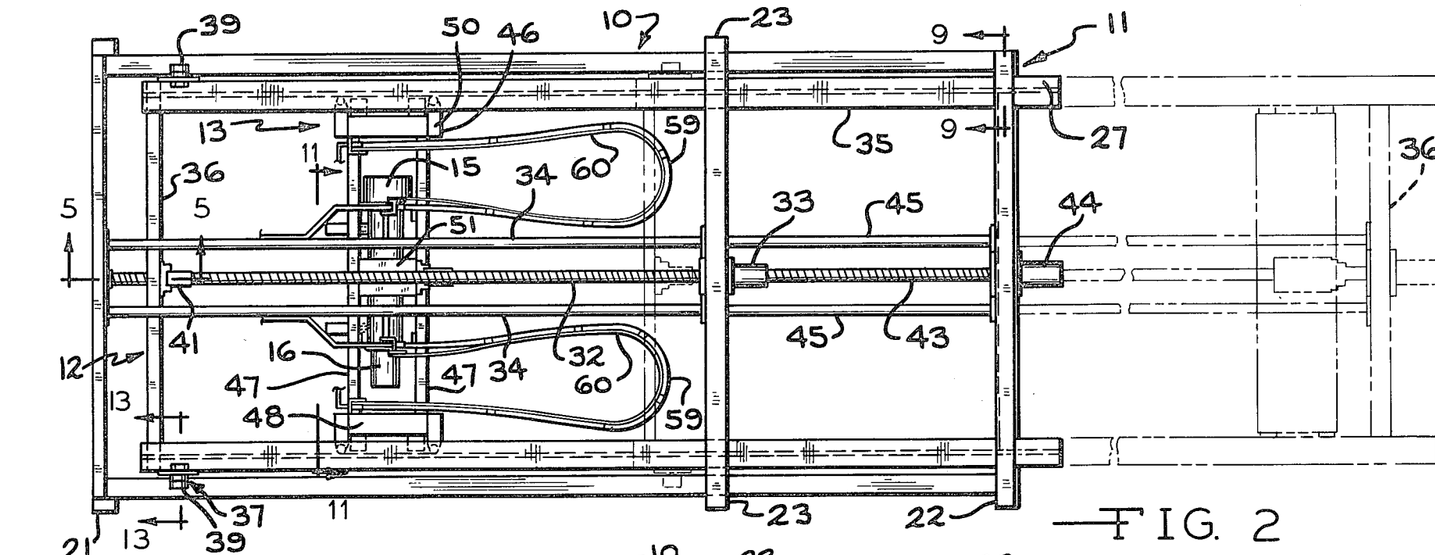
FIG. 2 is a top view of the weight transfer device showing the frame, telescoping carriage, trolley and hoist assemblies.
Figure 3:
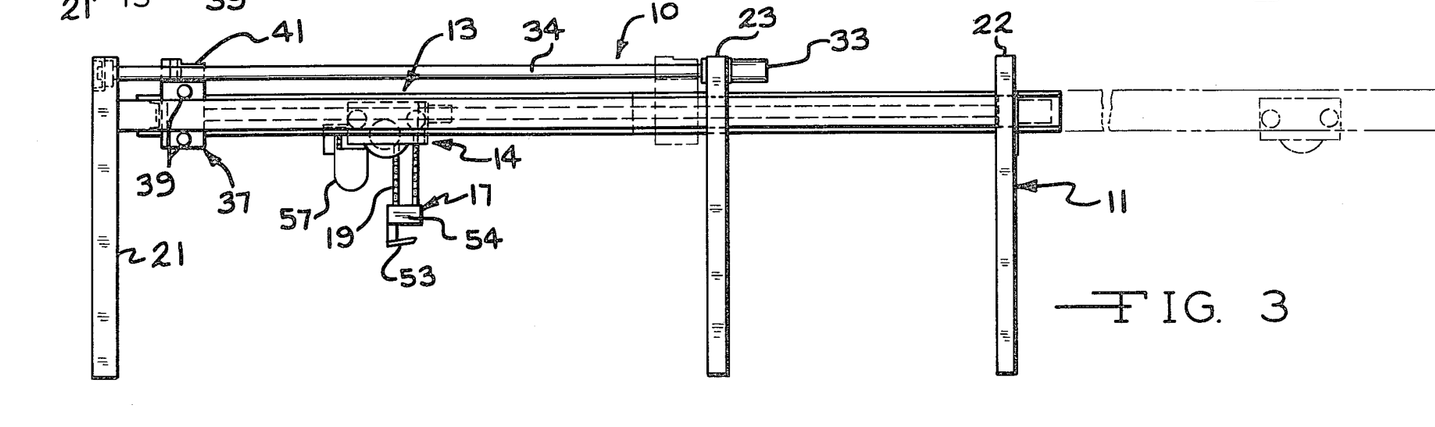
FIG. 3 is a side view of the weight transfer device showing the frame, telescoping carriage, trolley and hoist assemblies.
Figure 4:
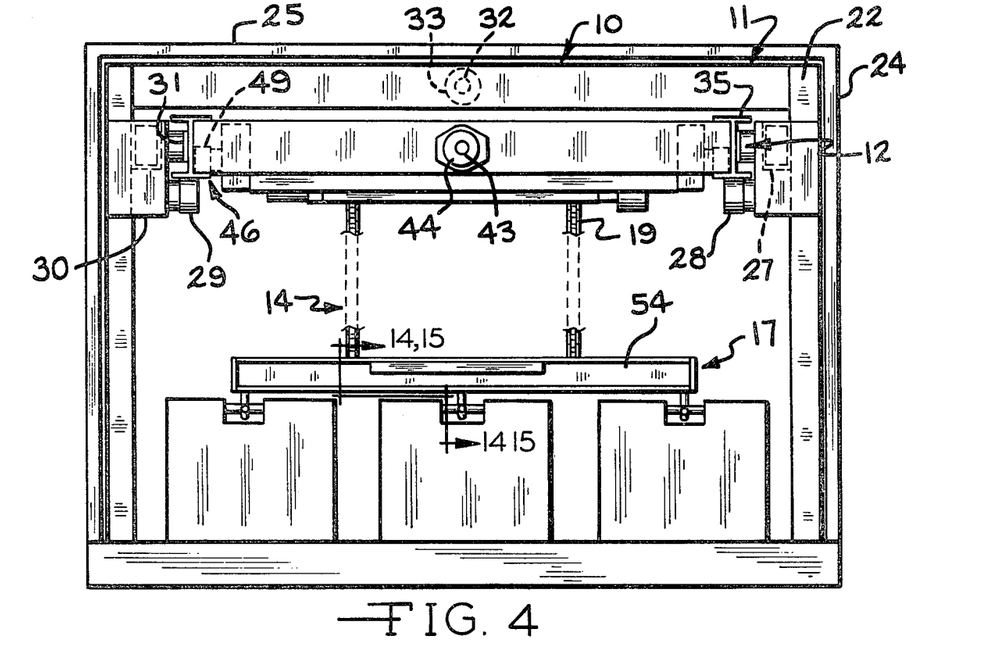
FIG. 4 is a rear view of the weight transfer device showing the frame, telescoping carriage, trolley and hoist assemblies.
Figures 5, 6, 7, 8:
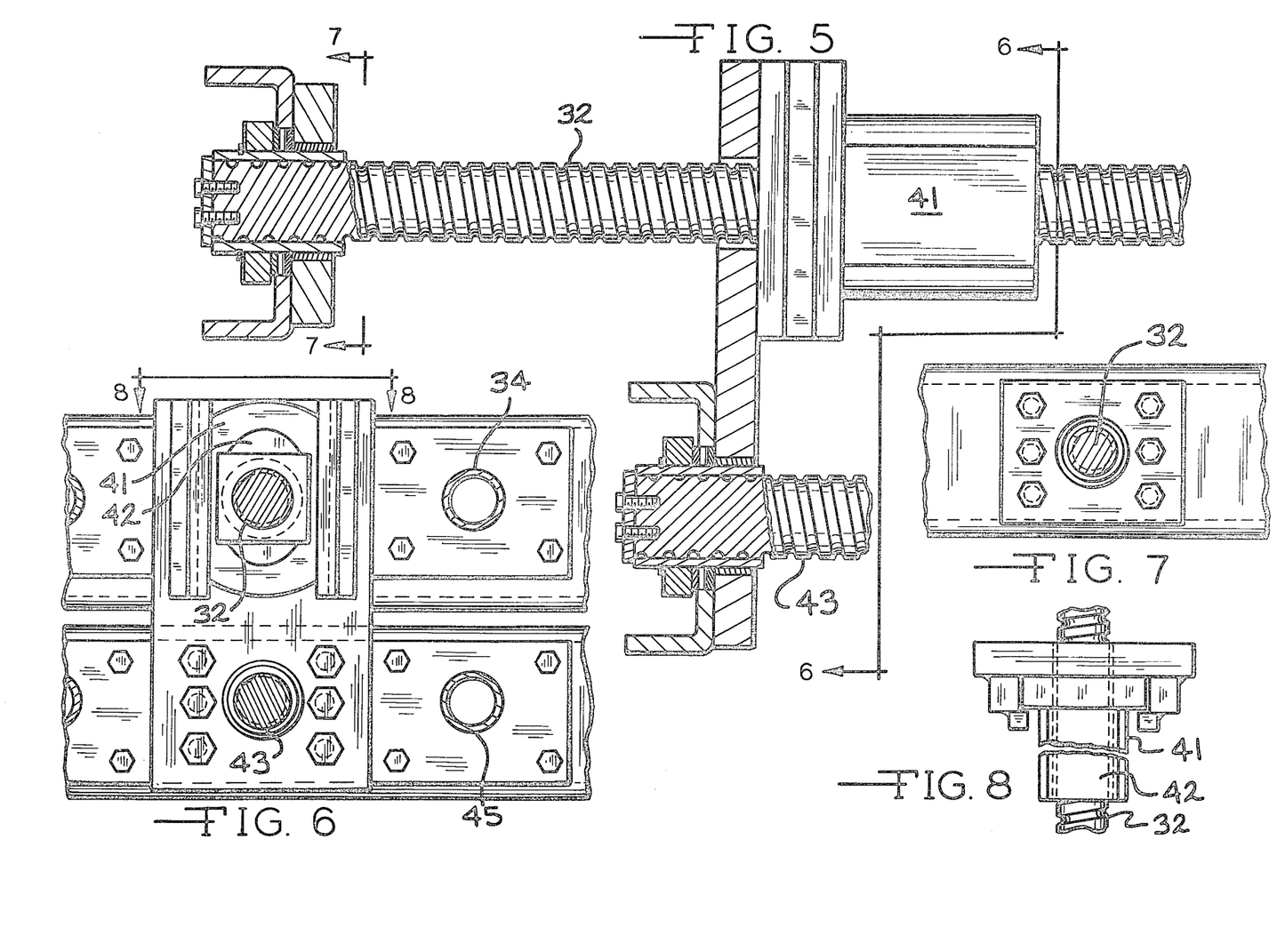
FIG. 5 is a fragmentary cross-sectional view taken along line 5—5 of FIG. 2.
FIG. 6 is a fragmentary cross-sectional view taken along line 6—6 of FIG. 5.
FIG. 7 is a fragmentary view taken along line 7—7 of FIG. 5.
FIG. 8 is a fragmentary view taken along line 8—8 of FIG. 6.
Figure 9:
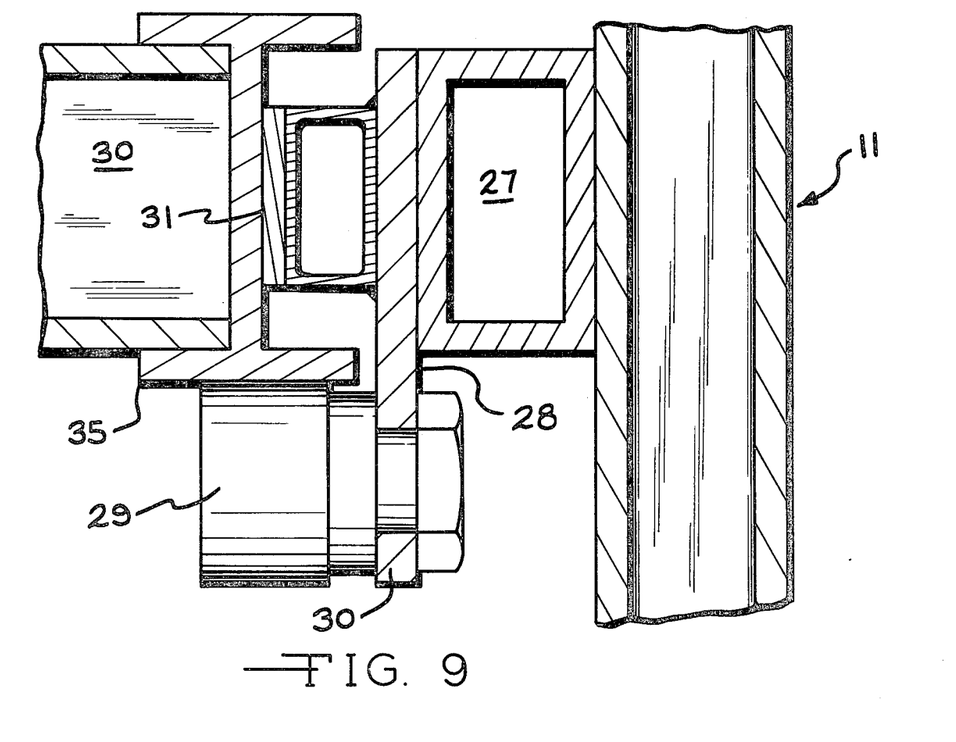
FIG. 9 is a fragmentary cross-sectional view taken along line 9—9 of FIG. 2.
Figure 10:
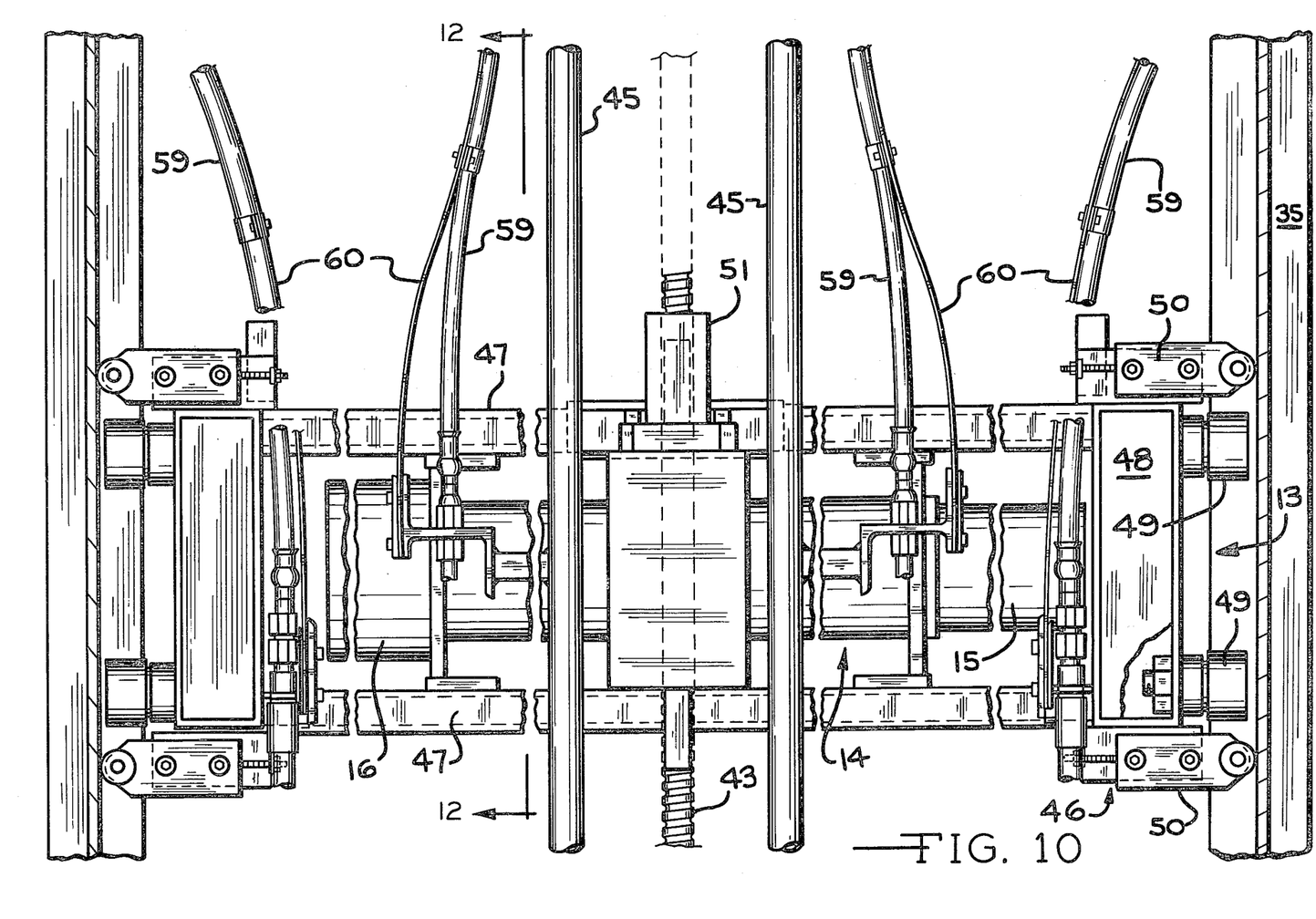
FIG. 10 is a detailed top view of the trolley and hoist assemblies, with portion broken away.
Figure 11:
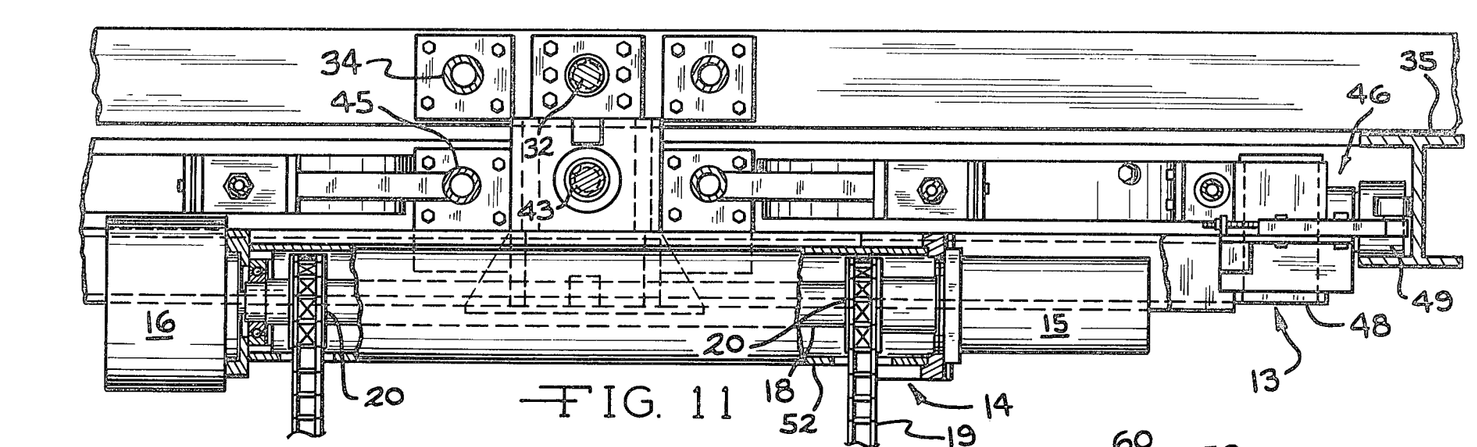
FIG. 11 is a detailed rear view of the trolley and hoist assemblies.
Figure 12:
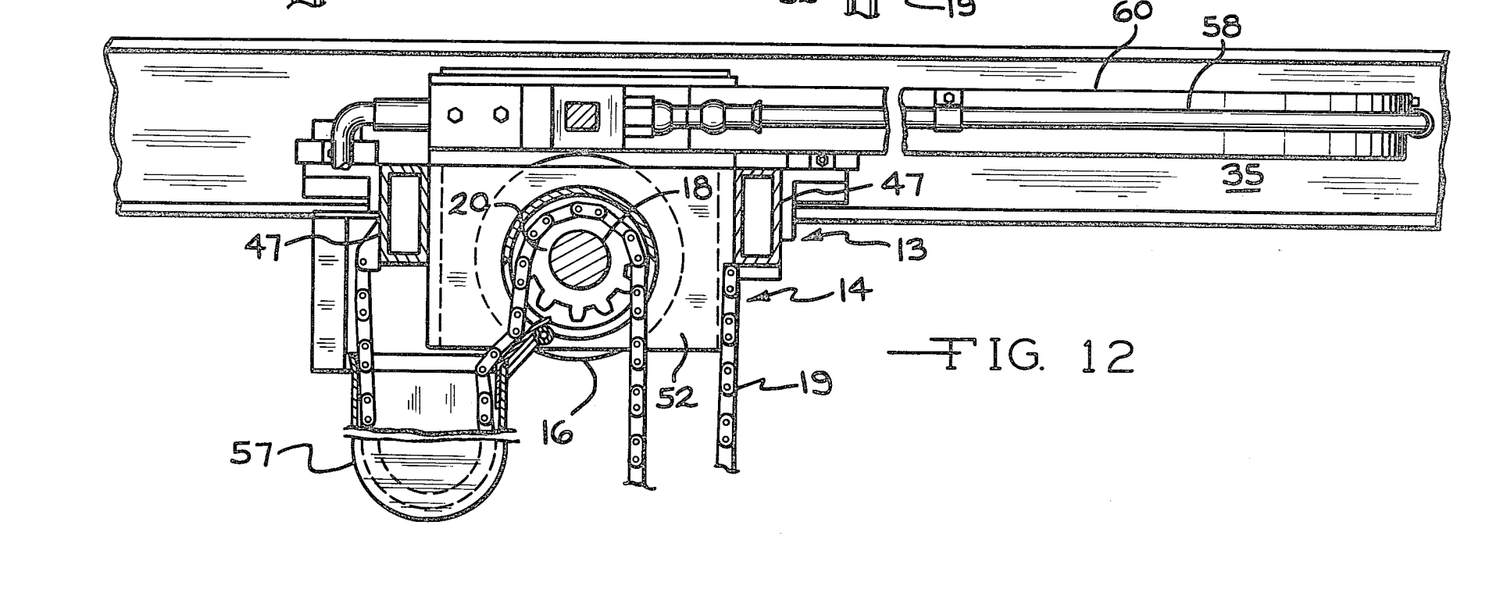
FIG. 12 is a fragmentary cross-sectional view taken along line 12—12 of FIG. 10.
Figures 13, 14, 15:
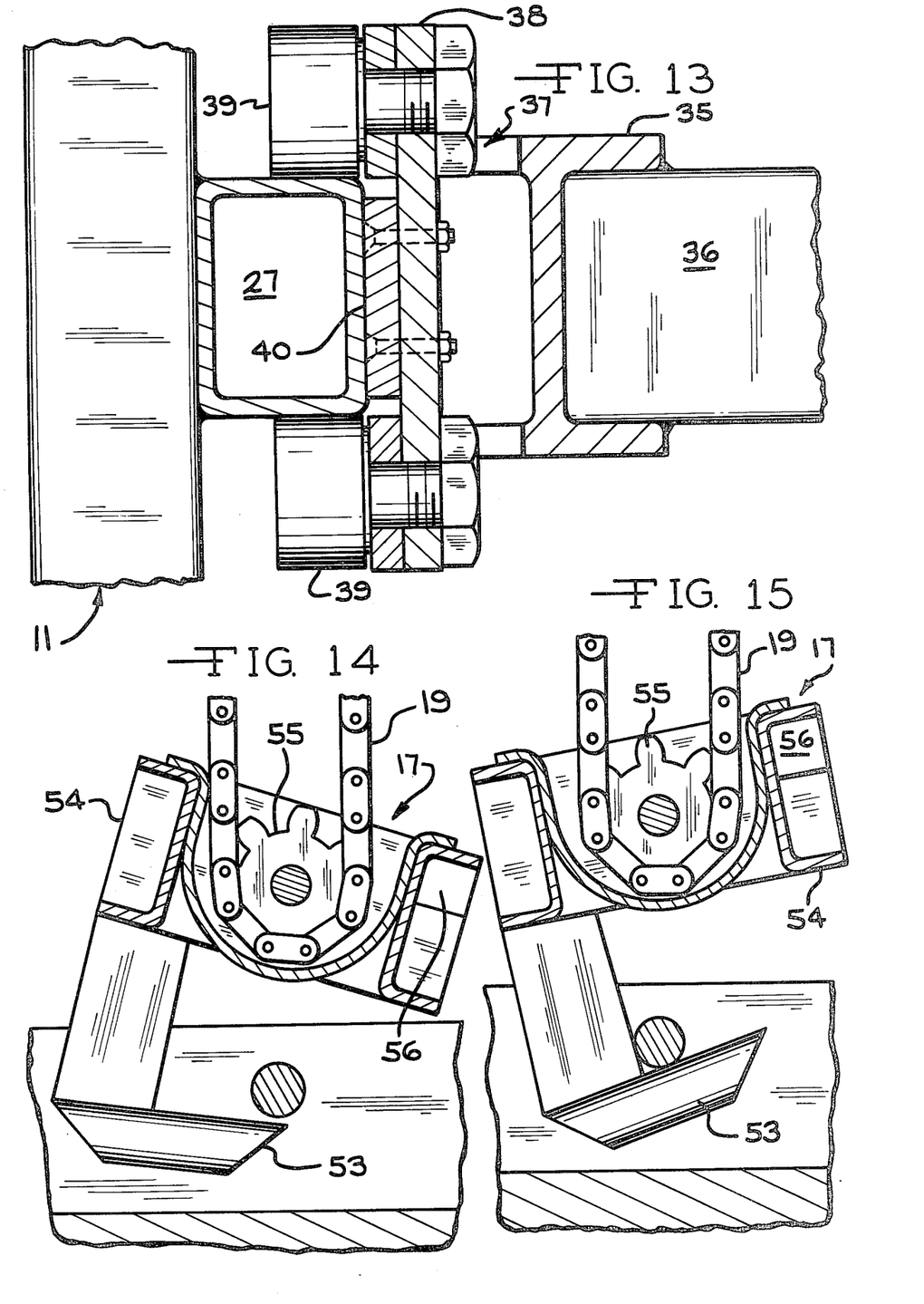
FIG. 13 is a fragmentary cross-sectional view taken along line 13—13 of FIG. 2.
FIG. 14 is a fragmentary cross-sectional view taken along lines 14—14 of FIG. 4 and showing the lift bar when not engaged with one or more of the weight units.
FIG. 15 is a fragmentary cross-sectional view taken along lines 15—15 of FIG. 4 and showing the lift bar engaged with one or more of the weight units.

The traversing member (54) includes a weight (56) on the edge of the traversing member (54) closest the open end of the hooks (53). When the lift bar (17) is unloaded the weight (56) causes the lift bar (10) to tilt thereby causing the open end of the hooks (53) to point downward, thus making the hooks (53) receptive to the weight units without outside assistance. As the lift bar (17) is raised, causing the weight units to be lifted, the weight units force the lift bar (17) back to a vertical position thereby allowing the hooks (53) to point upward and catch and hold the weight units.

The drive chain (19) has both ends permanently fixed to the trolley cross-braces (47). The chain (19) is then threaded along the sprockets (55) contained in the lift bar (17) and over the shaft sprockets (20). Any excess chain (19) caused by the vertical motion of the lift bar (17) is held in a chain bucket (57) fixed to the bottom of the trolley (13).

The hydraulic lines (58) for use with the various motors (33, 44) are located primarily adjacent the frame (11). The trolley hydraulic lines (57) which connect to the motor (15) and brake (16) located on the trolley (13) must be flexible to move as the trolley (13) moves. These trolley hydraulic lines (59) are fixed to thin bands (60) having great horizontal flexibility and great vertical rigidity. The bands (60) prevent the trolley hydraulic lines from hanging downward into the cargo compartment.

It will be appreciated that other arrangements of the weight transfer device may be used and that changes may be made in the elements of the weight transfer device without department from the scope of the following claims.

I claim:

1. A weight handling vehicle having a rear cargo compartment, said cargo compartment having a bed and opposed sidewalls, frame means positioned adjacent said sidewalls, said frame means including a plurality of ribs positioned adjacent said opposed sidewalls and opposed parallel tracks positioned on the end of said ribs spaced apart from said bed, a telescoping carriage means moveably positioned on said tracks of said frame means, carriage rollers positioned on said carriage means to engage said opposed tracks, a drive means operatively connected to said frame means and said carriage means, said drive means acting to move said carriage means, a first guide means connected to said carriage means to maintain said carriage means in alignment with said tracks, a trolley means moveably mounted on said telescoping carriage means, said trolley means being movable from a first position adjacent the front of the rear cargo compartment to a second position exterior of and spaced from the rearward end of said cargo compartment, a second drive means operatively connected to said carriage means and said trolley means, said second drive means acting to move said trolley means, a second guide means connected to said trolley means to maintain said trolley in alignment with said carriage means, and a vertical lifting means mounted on said trolley means for lifting one or more weight units.

2. A weight handling vehicle as defined in claim 1 wherein each of said opposed tracks includes a supporting roller guide, said supporting roller guide comprising a vertical support plate integrally fixed to said track, and a support roller on said vertical support member opposite said track wherein said telescoping carriage means is at least partially supported by said support roller.

3. A weight handling vehicle as defined in claim 2 wherein said telescoping carriage means comprises two opposed and horizontal rails adjacent the inside edges of said tracks and carriage cross-braces extending between said rails.

4. A weight handling vehicle as defined in claim 3 wherein said opposed and horizontal rails are supported by said support rollers.

5. A weight handling vehicle as defined in claim 3 wherein each of said rails includes a telescoping roller guide, said telescoping roller guide comprising a second vertical support plate integrally fixed to said rail, a roller on said second vertical support plate that moves on the top surface of said track, and a second roller on said vertical support plate that moves on the bottom surface of said track.

6. A weight handling vehicle as defined in claim 3 wherein said trolley means comprises two opposed trolley rolling units fitted to move on said opposing rails, and two trolley cross-braces extending between said trolley rolling units.

7. A weight handling vehicle as defined in claim 6 wherein said trolley rolling units each comprise a trolley support bar and two trolley support rollers on said trolley support bar that move on said rail.

8. A weight handling vehicle as defined in claim 7 wherein two trolley alignment rollers are mounted on said trolley rolling unit for moving on the vertical surface of said rail.

9. A weight handling vehicle as defined in claim 1 wherein said vertical lifting means comprises a lift bar for engaging one or more weight units and a means for vertically actuating said lift bar.

10. A weight handling vehicle as defined in claim 1 wherein said drive means connected to said frame means comprises a first worm screw rotatably connected to said frame, said first worm screw positioned parallel to said sidewalls of said rear cargo compartment and a first drive motor connected to said first worm screw.

11. A weight handling vehicle as defined in claim 10 wherein said first drive motor is hydraulic.

12. A weight handling vehicle as defined in claim 1 wherein said second drive means connected to said telescoping carriage means and said trolley means comprises a second worm screw rotatably connected to said telescoping carriage means, said second worm screw positioned parallel to said first worm screw and a second drive motor connected to said second worm screw.

13. A weight handling vehicle as defined in claim 12 wherein said second drive motor is hydraulic.

14. A weight handling vehicle as defined in claim 10 where a standard rolled thread ball bearing screw assembly is connected to said telescoping carriage means, said first worm screw being threaded through said ball bearing screw assembly.

15. A weight handling device as defined in claim 14 wherein said standard rolled thread ball bearing screw assembly includes a floating thread contained within an elongated oval passageway.

16. A weight handling vehicle as defined in claim 12 wherein a second standard rolled thread ball bearing screw assembly is connected to said trolley, said second worm screw being threaded through said ball bearing screw assembly.

17. The weight handling vehicle of claim 3 wherein said first guide means includes at least one longitudinal member connected to said ribs of said frame, said longitudinal member passing through said cross braces of said carriage means, said longitudinal axis of said longitudinal member being substantially parallel to the direction of movement of said carriage.

18. The weight handling vehicle of claim 6 wherein said second guide means includes at least one longitudinal member connected to said cross braces of said carriage means, said longitudinal member passing through said trolley cross braces, said longitudinal axis of said longitudinal member being substantially parallel to the direction of movement of said trolley.

* * * * *